United States Patent
Matsumoto

(10) Patent No.: US 11,225,532 B2
(45) Date of Patent: *Jan. 18, 2022

(54) RUBBER COMPOSITION FOR TIRES, METHOD FOR PREPARING RUBBER COMPOSITION FOR TIRES, AND TIRE

(71) Applicant: SUMITOMO RUBBER INDUSTRIES, LTD., Kobe (JP)

(72) Inventor: Norihiro Matsumoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 183 days.

This patent is subject to a terminal disclaimer.

(21) Appl. No.: 15/950,808

(22) Filed: Apr. 11, 2018

(65) Prior Publication Data

US 2018/0305469 A1 Oct. 25, 2018

(30) Foreign Application Priority Data

Apr. 25, 2017 (JP) .............................. JP2017-086252

(51) Int. Cl.
| | | |
|---|---|---|
| C08C 4/00 | (2006.01) | |
| B60C 1/00 | (2006.01) | |
| C08K 3/30 | (2006.01) | |
| C08L 9/06 | (2006.01) | |
| G01N 23/18 | (2018.01) | |
| C08L 9/00 | (2006.01) | |

(Continued)

(52) U.S. Cl.
CPC .............. *C08C 4/00* (2013.01); *B60C 1/0016* (2013.01); *C08K 3/06* (2013.01); *C08K 3/30* (2013.01);
(Continued)

(58) Field of Classification Search
CPC ...... G01N 23/185; G01N 23/201; C08K 5/47; C08K 5/31; C08K 3/06; C08K 3/30
(Continued)

(56) References Cited

U.S. PATENT DOCUMENTS

2011/0184085 A1* 7/2011 Otsubo ..................... C08L 7/00
523/156
2014/0140483 A1* 5/2014 Mashita ............... G01N 23/202
378/86
(Continued)

FOREIGN PATENT DOCUMENTS

CN 104292520 B * 9/2016
JP 2013-194088 A 9/2013
(Continued)

OTHER PUBLICATIONS

Carbon Black, Encyclopedia of Polymer Science and Technology, Wang et al. (Year: 2003).*
English language machine translation of CN 104292520 (Year: 2016).*
Ikeda et al., "Vulcanization: New Focus on a Traditional Technology by Small-Angle Neutron Scattering," Macromolecules, vol. 42, 2009 (Published on Web Mar. 16, 2009), pp. 2741-2748.

*Primary Examiner* — Angela C Scott
(74) *Attorney, Agent, or Firm* — Birch, Stewart, Kolasch & Birch, LLP

(57) ABSTRACT

Provided are a rubber composition for tires having low tan δ at approximately 60° C. and excellent breaking energy at approximately 25° C.; a method for preparing the rubber composition for tires; and a tire thereof. The present invention relates to a rubber composition for tires which contains a rubber component including an isoprene-based rubber, and which has a correlation length $\Xi_b$ of 50 nm or less as determined by fitting the following Equations 1 to 6 to a scattering intensity curve I(q) obtained by X-ray scattering analysis or neutron scattering analysis:

$$I_{(q)} = \frac{A}{1+q^2\xi^2} + \frac{B}{(1+q^2\Xi_b^2)^2} + \frac{C}{(1+q^2\Xi_c^2)^2} \quad \text{(Equation 1)}$$

$$\xi < \Xi_b < \Xi_c \quad \text{(Equation 2)}$$

$$A = 8\pi N_a \sigma^2 \xi^3 \quad \text{(Equation 3)}$$

$$B = 4\pi N_b \sigma^2 \Xi_b^2 \quad \text{(Equation 4)}$$

$$C = 4\pi N_c \sigma^2 \Xi_c^2 \quad \text{(Equation 5)}$$

$$q = \frac{4\pi \sin\frac{\theta}{2}}{\lambda} \quad \text{(Equation 6)}$$

A, B, C, ξ, $\Xi_b$, $\Xi_c$: fitting parameter q: scattering vector $N_a$: number per unit volume (number/cm³) of scatterers having a correlation length ξ

$N_b$: number per unit volume (number/cm³) of scatterers having a correlation length $\Xi_b$ $N_c$: number per unit volume (number/cm³) of scatterers having a correlation length $\Xi_c$ σ: electron density difference (electron·(cm⁻³)) between scatterers and the surrounding matrix or scattering length density difference (cm⁻²) between scatterers and the surrounding solvent θ: scattering angle λ: wavelength of X rays or neutrons.

4 Claims, 1 Drawing Sheet

(51) Int. Cl.
*G01N 23/201* (2018.01)
*C08K 5/47* (2006.01)
*C08K 3/06* (2006.01)
*C08K 5/31* (2006.01)

(52) U.S. Cl.
CPC .................. *C08K 5/31* (2013.01); *C08K 5/47* (2013.01); *C08L 9/00* (2013.01); *C08L 9/06* (2013.01); *G01N 23/185* (2013.01); *G01N 23/201* (2013.01)

(58) Field of Classification Search
CPC ... C08K 3/04; C08K 5/18; C08K 5/09; C08K 3/22; C08C 4/00; C08L 9/00; C08L 9/06; B60C 1/0016
USPC .......................................................... 523/155
See application file for complete search history.

(56) References Cited

U.S. PATENT DOCUMENTS

2018/0016402 A1   1/2018  Miyazaki et al.
2019/0315946 A1*  10/2019 Matsumoto ........... B60C 1/0016

FOREIGN PATENT DOCUMENTS

| JP | 2014-95020 A | 5/2014 |
| JP | 2015-10136 A | 1/2015 |
| JP | 5658219 B2 | 1/2015 |
| JP | 2015-30815 A | 2/2015 |
| JP | 2015-86318 A | 5/2015 |
| JP | 2015-98539 A | 5/2015 |
| JP | 2015-137311 A | 7/2015 |
| JP | 2015-209536 A | 11/2015 |
| WO | WO 2016/136453 A1 | 9/2016 |

* cited by examiner

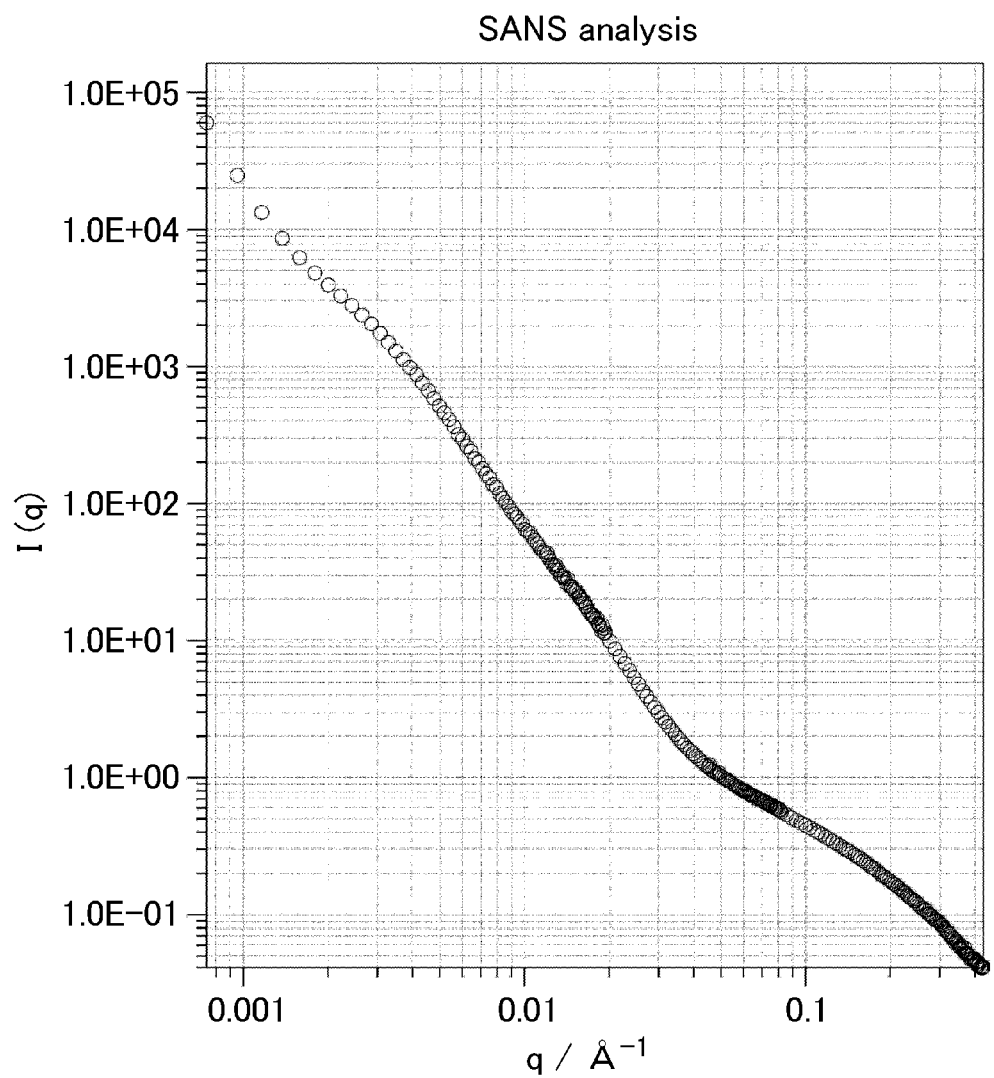

RUBBER COMPOSITION FOR TIRES, METHOD FOR PREPARING RUBBER COMPOSITION FOR TIRES, AND TIRE

TECHNICAL FIELD

The present invention relates to a rubber composition for tires, a method for preparing a rubber composition for tires, and a tire.

BACKGROUND ART

Along with the trend toward carbon dioxide emission control due to the increased attention on environmental issues these days, the demand for fuel efficient cars has been increasing. This has created a further need for tires with reduced rolling resistance.

The crosslinked structure of rubber compositions for tires is known to correlate with their physical properties. Thus, various techniques have been developed to analyze the crosslinked structure (for example, Patent Literature 1 and Non-Patent Literature 1). Patent Literature 1 reports that, for example, rubber compositions having a homogeneously crosslinked structure show lower energy loss; however, the method for providing a homogeneously crosslinked structure has not been sufficiently studied.

CITATION LIST

Patent Literature

Patent Literature 1: JP 5658219 B

Non Patent Literature

None-Patent Literature 1: Yuko Ikeda et al., Vulcanization: New Focus on a Traditional Technology by Small-Angle Neutron Scattering, Macromolecules 2009, 42, 2741-2748

SUMMARY OF INVENTION

Technical Problem

The studies of the present inventor have revealed that tan δ at approximately 60° C. and breaking energy (a quotient obtained by dividing a product of tensile strength at break and elongation at break by two) at approximately 25° C. are simultaneously improved by controlling the crosslinked structure.

The present invention aims to provide a rubber composition for tires having low tan δ at approximately 60° C. and excellent breaking energy at approximately 25° C., a method for preparing the rubber composition for tires, and a tire thereof.

Solution to Problem

As a result of extensive research and experimentation to achieve this goal, the present inventor has found that when a rubber composition containing an isoprene-based rubber is controlled to have a crosslinked structure with a reduced correlation length $\Xi_b$, wherein the correlation length $\Xi_b$ is determined by fitting the Equations 1 to 6 below to a scattering intensity curve I(q) obtained by X-ray scattering analysis or neutron scattering analysis, tires including the crosslinked rubber composition can achieve sufficiently reduced energy loss and sufficiently improved breaking properties. This finding has led to the completion of the present invention.

Specifically, the rubber composition for tires of the present invention contains a rubber component including an isoprene-based rubber, and has a correlation length $\Xi_b$ of 50 nm or less as determined by fitting the following Equations 1 to 6 to a scattering intensity curve I(q) obtained by X-ray scattering analysis or neutron scattering analysis:

$$I_{(q)} = \frac{A}{1+q^2\xi^2} + \frac{B}{(1+q^2\Xi_b^2)^2} + \frac{C}{(1+q^2\Xi_c^2)^2} \quad \text{(Equation 1)}$$

$$\xi < \Xi_b < \Xi_c \quad \text{(Equation 2)}$$

$$A = 8\pi N_a \sigma^2 \xi^3 \quad \text{(Equation 3)}$$

$$B = 4\pi N_b \sigma^2 \Xi_b^2 \quad \text{(Equation 4)}$$

$$C = 4\pi N_c \sigma^2 \Xi_c^2 \quad \text{(Equation 5)}$$

$$q = \frac{4\pi \sin\frac{\theta}{2}}{\lambda} \quad \text{(Equation 6)}$$

A, B, C, $\xi$, $\Xi_b$, $\Xi_c$: fitting parameter
q: scattering vector
$N_a$: number per unit volume (number/cm³) of scatterers having a correlation length $\xi$
$N_b$: number per unit volume (number/cm³) of scatterers having a correlation length $\Xi_b$
$N_c$: number per unit volume (number/cm³) of scatterers having a correlation length $\Xi_c$
σ: electron density difference (electron·(cm⁻³)) between scatterers and the surrounding matrix or scattering length density difference (cm⁻²) between scatterers and the surrounding solvent
θ: scattering angle
λ: wavelength of X rays or neutrons Preferably, the X-ray scattering analysis is small-angle X-ray scattering analysis, and the neutron scattering analysis is small-angle neutron scattering analysis.

The value of q defined by Equation 6 is preferably 10 nm⁻¹ or less.

Another aspect of the present invention is a method for preparing the rubber composition for tires, the method including: a kneading step (A) of kneading the isoprene-based rubber, sulfur, and a basic agent that, either itself or after decomposition with hydrogen sulfide, has a pKa in water at 25° C. of more than 8.0; a kneading step (B) of kneading a kneaded mixture obtained after the kneading step (A) and a vulcanization accelerator; and a vulcanization step of vulcanizing a kneaded mixture obtained after the kneading step (B).

Another aspect of the present invention is a tire, formed from the rubber composition for tires.

Advantageous Effects of Invention

The rubber composition of the present invention contains an isoprene-based rubber, and has a correlation length $\Xi_b$ within a predetermined range as determined by fitting Equations 1 to 6 to a scattering intensity curve I(q) obtained by X-ray scattering analysis or neutron scattering analysis. Such a rubber composition has low tan δ at approximately 60° C. and excellent breaking energy at approximately 25° C.

BRIEF DESCRIPTION OF DRAWINGS

FIG. 1 illustrates one example of a scattering intensity curve obtained by SANS analysis.

DESCRIPTION OF EMBODIMENTS

The rubber composition for tires of the present invention contains a rubber component including an isoprene-based rubber, and has a correlation length $\Xi_b$ of 50 nm or less as determined by fitting Equations 1 to 6 to a scattering intensity curve I(q) (for example, FIG. 1) obtained by X-ray scattering analysis or neutron scattering analysis.

Among the fitting parameters obtained by the curve fitting, a correlation length $\xi$ within of 1 nm to 100 μm is assumed to correspond to the distance between cross-linking points in the polymer, and a correlation length $\Xi_b$ of 0.1 nm to 100 μm is assumed to correspond to the size of network inhomogeneities in the polymer. The correlation length $\Xi_b$ of 0.1 nm to 100 μm is assumed to be the most important factor of the crosslinked structure of the rubber composition. Thus, it is assumed that both low tan δ at approximately 60° C. and high breaking energy at approximately 25° C. can be achieved by controlling the correlation length $\Xi_b$.

It should be noted that the correlation length $\Xi_b$ in the present invention is measured on plate-like samples having a thickness of about 1 mm, a length of about 16 mm, and a width of about 16 mm. For tire samples, the measurement may be performed on such plate-like samples cut out of tire components such as treads of vulcanized tires.

The curve fitting is carried out by least squares.

In the present invention, both low tan δ at approximately 60° C. and high breaking energy at approximately 25° C. are achieved by controlling the correlation length $\Xi_b$ to 50 nm or less. In order to further reduce tan δ at appropriately 60° C. and, at the same time, further increase breaking energy at appropriately 25° C., the correlation length $\Xi_b$ is preferably 40 nm or less, more preferably 30 nm or less, particularly preferably 20 nm or less. The lower limit is not particularly critical, and is preferably as small as possible.

The X-ray scattering analysis may suitably be small-angle X-ray scattering (SAXS) analysis (scattering angle: typically 10 degrees or smaller) in which polymer materials are irradiated with X-rays to measure the scattering intensity.

In the small-angle X-ray scattering analysis, structural information of a substance may be obtained by measuring the X-rays scattered at small scattering angles among the scattered X-rays resulting from the irradiation of the substance with X-rays. In this way, ordered structures on the order of a few nanometers such as microphase-separated structures of polymer materials may be analyzed.

To obtain detailed molecular structural information, the SAXS analysis should desirably measure an X-ray scattering profile with a high S/N ratio. Thus, the X-rays radiated from a synchrotron preferably have a brilliance of at least $10^{10}$ (photons/s/mrad²/mm²/0.1% bw).

The symbol bw denotes the band width of X-rays radiated from a synchrotron. Examples of such synchrotrons include the beamline BL03XU and BL20XU of the large synchrotron radiation facility "SPring-8" belonging to Japan Synchrotron Radiation Research Institute.

The term "S/N ratio" is an abbreviation of "signal/noise ratio" calculated by dividing the signal variance by the noise variance.

The brilliance (photons/s/mrad²/mm²/0.1% bw) of the X-rays is preferably $10^{10}$ or higher, more preferably $10^{12}$ or higher. The upper limit is not particularly critical, and the X-ray intensity used is preferably low enough not to cause radiation damage.

The number of photons (photons/s) in the X-rays is preferably $10^7$ or more, more preferably $10^9$ or more. The upper limit is not particularly critical, and the X-ray intensity used is preferably low enough not to cause radiation damage.

The neutron scattering analysis may suitably be small-angle neutron scattering (SANS) analysis (scattering angle: typically 10 degrees or smaller) in which polymer materials are irradiated with neutrons to measure the scattering intensity.

In the small-angle neutron scattering analysis, structural information of a substance may be obtained by measuring the neutrons scattered at small scattering angles among the scattered neutrons resulting from the irradiation of the substance with neutrons. In this way, ordered structures on the order of a few nanometers such as microphase-separated structures of polymer materials may be analyzed.

The SANS analysis may employ known magnetic structure-based techniques or deuteration techniques. In the case of deuteration techniques, for example, a polymer material may be swollen in a deuterated solvent, and the polymer material in equilibrium in the deuterated solvent may be irradiated with neutrons to measure the scattering intensity. Examples of such deuterated solvents for swelling polymer materials include heavy water, deuterated hexane, deuterated toluene, deuterated chloroform, deuterated methanol, deuterated DMSO ($(D_3C)_2S=O$), deuterated tetrahydrofuran, deuterated acetonitrile, deuterated dichloromethane, deuterated benzene, and deuterated N,N-dimethylformamide.

The neutrons for use in the neutron scattering analysis such as SANS may be obtained from, for example, the SANS-J beamline at the JRR-3 research reactor belonging to Japan Atomic Energy Agency, Independent Administrative Agency.

The flux density (neutrons/cm²/s) of the neutrons is preferably $10^3$ or higher, more preferably $10^4$ or higher, because then a neutron scattering profile with a high S/N ratio can be obtained as in the case with the SAXS analysis. The upper limit is not particularly critical, and the neutron flux density used is preferably low enough not to cause radiation damage.

In the X-ray or neutron scattering analysis, since finer molecular structures of polymer materials need to be measured, the analysis is preferably carried out under conditions where the value of q defined by Equation 6 is in a range of 10 nm$^{-1}$ or less. The q range is more preferably 20 nm$^{-1}$ or less because a greater numerical value desirably provides smaller pieces of information.

The X-rays scattered in the SAXS analysis are detected by an X-ray detector, and an image is then generated by an image processor or the like using the X-ray detection data from the X-ray detector.

Examples of the X-ray detector include two-dimensional detectors such as X-ray films, nuclear emulsion plates, X-ray image pickup tubes, X-ray fluorescent amplifiers, X-ray image intensifiers, X-ray imaging plates, X-ray CCDs, and X-ray amorphous materials; and line sensor one-dimensional detectors. The X-ray detector may be selected appropriately depending on the type or conditions of the polymer material to be analyzed, or other factors.

The image processor may appropriately be a common one that can generate X-ray scattering images based on the X-ray detection data from the X-ray detector.

The SANS analysis may also be carried out based on the same principle as in the SAXS analysis; the neutrons scattered are detected by a neutron detector, and an image is then generated by an image processor or the like using the neutron detection data from the neutron detector. Similarly as above, the neutron detector may be a known two-dimensional detector or one-dimensional detector, and the image processor may be a known one that can generate neutron scattering images. These devices may be appropriately selected.

The rubber composition of the present invention contains an isoprene-based rubber. Examples of the isoprene-based rubber include natural rubber (NR), synthetic polyisoprene rubber (IR), modified NR or IR obtained by modifying NR or IR, refined NR obtained by partly or completely removing phospholipids or proteins from NR, copolymers of isoprene and other monomers, and liquid IR. These isoprene-based rubbers may be used alone, or two or more of these may be used in combination. In addition to the isoprene-based rubber, the rubber composition of the present invention may also contain other materials that may be used in the tire field.

For example, the rubber component of the rubber composition of the present invention may include rubbers other than the isoprene-based rubber. Preferred other rubbers include those which, like isoprene-based rubbers, can generate stable tertiary radicals. Rubbers that cannot generate tertiary radicals, such as styrene butadiene rubber (SBR) and polybutadiene rubber (BR) may also be used. Moreover, butyl-based rubbers may also be used.

In the case where SBR is used, any SBR commonly used in the tire industry may be used. Examples include emulsion-polymerized styrene butadiene rubber (E-SBR) and solution-polymerized styrene butadiene rubber (S-SBR).

In the case where BR is used, any BR commonly used in the tire industry may be used. Examples include high-cis BRs such as BR 1220 available from Zeon Corporation and BR130B and BR150B both available from Ube Industries, Ltd., and BRs containing syndiotactic polybutadiene crystals such as VCR412 and VCR617 both available from Ube Industries, Ltd.

In the case where a butyl-based rubber is used, any butyl-based rubber commonly used in the tire industry may be used. Examples include butyl rubber (IIR) and halogenated butyl rubbers (X-IIR) such as brominated butyl rubber (Br-IIR) and chlorinated butyl rubber (Cl-IIR).

To facilitate the formation of a further homogeneously crosslinked structure, the amount of the isoprene-based rubber based on 100% by mass of the rubber component in the rubber composition of the present invention is preferably 1% by mass or more or 20% by mass or more, more preferably 50% by mass or more or 70% by mass or more, still more preferably 90% by mass or more, and may be 100% by mass. The amount of each rubber other than the isoprene-based rubber based on 100% by mass of the rubber component is preferably 99% by mass or less or 80% by mass or less, more preferably 50% by mass or less or 30% by mass or less, still more preferably 10% by mass or less, and may be 0% by mass.

The rubber composition of the present invention may contain carbon black, for example. Any carbon black commonly used in the tire industry may be used. Examples include N134, N110, N220, N234, N219, N339, N330, N326, N351, N550, and N762. In the case where carbon black is used, the amount of carbon black per 100 parts by mass of the rubber component is preferably 1 part by mass or more or 15 parts by mass or more, more preferably 30 parts by mass or more, but is preferably 100 parts by mass or less, more preferably 80 parts by mass or less.

The rubber composition of the present invention may contain silica, for example. Any silica commonly used in the tire industry may be used. Examples include dry silica (anhydrous silica) and wet silica (hydrous silica). In the case where silica is used, the amount of silica per 100 parts by mass of the rubber component is preferably 1 part by mass or more or 15 parts by mass or more, more preferably 30 parts by mass or more, but is preferably 200 parts by mass or less, more preferably 150 parts by mass or less.

In the case where silica is present, a silane coupling agent may be added. Any silane coupling agent commonly used in the tire industry may be used. Examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. In the case where a silane coupling agent is used, the amount of the silane coupling agent per 100 parts by mass of silica is preferably 1 part by mass or more but is preferably 15 parts by mass or less.

Non-limiting examples of fillers other than carbon black and silica include those commonly used in the tire industry, including, for example, inorganic fillers such as aluminum hydroxide, talc, mica, magnesium oxide, magnesium sulfate, titanium white, titanium black, calcium oxide, calcium hydroxide, magnesium aluminum oxide, clay, pyrophyllite, bentonite, aluminum silicate, magnesium silicate, calcium silicate, aluminum calcium silicate, magnesium silicate, silicon carbide, zirconium, and zirconium oxide; and organic fillers such as short fibers and cellulose nanofibers.

The rubber composition of the present invention may contain a resin, for example. Any resin commonly used in the tire industry may be used. Examples include aromatic petroleum resins, terpene resins, dicyclopentadiene (DCPD) resins, coumarone-indene resins, α-methylstyrene resins, p-t-butylphenol acetylene resins, and acrylic resins. In the case where a resin is used, the amount of the resin per 100 parts by mass of the rubber component is preferably 1 part by mass or more or 15 parts by mass or more, more preferably 30 parts by mass or more, but is preferably 200 parts by mass or less, more preferably 150 parts by mass or less.

The rubber composition of the present invention may contain an antioxidant, for example. Any antioxidant commonly used in the tire industry may be used. Examples include naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl)-propionate]methane. In the case where an antioxidant is used, the amount of the antioxidant per 100 parts by mass of the rubber component is preferably 0.1 parts by mass or more, more preferably 0.5 parts by mass or more, but is preferably 5 parts by mass or less, more preferably 3 parts by mass or less.

The rubber composition of the present invention may contain an oil, for example. Any oil commonly used in the tire industry may be used. Examples include process oils such as paraffinic process oils, aromatic process oils, and naphthenic process oils; and plant oils such as castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. In the case where an oil is used, the amount of the oil per 100 parts by mass of the rubber component is preferably 1 part by mass or more, but is preferably 100 parts by mass or less.

The rubber composition of the present invention may contain a wax, for example. Any wax commonly used in the tire industry may be used. Examples include petroleum waxes such as paraffin waxes and microcrystalline waxes; naturally occurring waxes such as plant waxes and animal waxes; and synthetic waxes such as polymers of ethylene, propylene, or the like. In the case where a wax is used, the amount of the wax per 100 parts by mass of the rubber component is preferably 0.1 parts by mass or more, but is preferably 10 parts by mass or less.

The rubber composition of the present invention may contain a processing aid, for example. Any processing aid commonly used in the tire industry may be used. Examples include fatty acid metal salts, fatty acid amides, amide esters, silica surface activators, fatty acid esters, mixtures of fatty acid metal salts and amide esters, and mixtures of fatty acid metal salts and fatty acid amides. In the case where a processing aid is used, the amount of the processing aid per 100 parts by mass of the rubber component is preferably 0.1 parts by mass or more, but is preferably 10 parts by mass or less.

The rubber composition of the present invention may contain sulfur, for example. In the case where sulfur is used, the amount of sulfur per 100 parts by mass of the rubber component is preferably 0.5 parts by mass or more, more preferably 1.5 parts by mass or more, but is preferably 6 parts by mass or less, more preferably 4 parts by mass or less.

The rubber composition of the present invention may contain a vulcanization accelerator, for example. Any vulcanization accelerator commonly used in the tire industry may be used. Examples include guanidine vulcanization accelerators, sulfenamide vulcanization accelerators, thiazole vulcanization accelerators, thiuram vulcanization accelerators, dithiocarbamate vulcanization accelerators, thiourea vulcanization accelerators, and xanthate vulcanization accelerators. These vulcanization accelerators may be used alone, or two or more of these may be used in combination. Among these, sulfenamide vulcanization accelerators are preferred, and the following sulfenamide vulcanization accelerators may be used: N-cyclohexyl-2-benzothiazolylsulfenamide (CBS), N-oxydiethylene-2-benzothiazolylsulfenamide (OBS), N-(tert-butyl)-2-benzothiazolylsulfenamide (TBBS), N-(tert-butyl)-2-benzothiazolylsulfenimide (TBSI), N,N-dicyclohexylbenzothiazole-2-sulfenamide (DCBS), and N,N-diisopropylbenzothiazole-2-sulfenamide (DIBS).

In the case where a vulcanization accelerator is used, the amount of the vulcanization accelerator per 100 parts by mass of the rubber component is preferably 0.5 parts by mass or more, more preferably 1.5 parts by mass or more, but is preferably 6 parts by mass or less, more preferably 4 parts by mass or less.

The rubber composition of the present invention may contain zinc oxide, for example. In the case where zinc oxide is used, the amount of zinc oxide per 100 parts by mass of the rubber component is preferably 1 part by mass or more, more preferably 2 parts by mass or more, but is preferably 8 parts by mass or less, more preferably 6 parts by mass or less.

The rubber composition of the present invention may contain stearic acid, for example. In the case where stearic acid is used, the amount of stearic acid per 100 parts by mass of the rubber component is preferably 1 part by mass or more, more preferably 2 parts by mass or more, but is preferably 8 parts by mass or less, more preferably 6 parts by mass or less.

The rubber composition of the present invention is used in tire applications. The rubber composition of the present invention is preferably used for treads of tires. It may also be used for various tire components such as sidewalls, base treads, undertreads, clinch apexes, bead apexes, breaker cushion rubbers, carcass cord topping rubbers, insulations, chafers, innerliners, and side reinforcing layers of run-flat tires. The type of tire to which the rubber composition may be applied is preferably a pneumatic tire. Besides, the rubber composition may also be applied to pneumatic or non-pneumatic tires of passenger vehicles, trucks and buses, or motorcycles.

The rubber composition having a correlation length $\Xi_b$ of 50 nm or less in the tire according to the present invention may be prepared by, for example, a method including: a kneading step (A) of kneading an isoprene-based rubber, sulfur, and a basic agent that, either itself or after decomposition with hydrogen sulfide, has a pKa in water at 25° C. of more than 8.0; a kneading step (B) of kneading a kneaded mixture obtained after the kneading step (A) and a vulcanization accelerator; and a vulcanization step of vulcanizing a kneaded mixture obtained after the kneading step (B). A kneading step for adding other materials may be performed before the kneading step (A), between the kneading steps (A) and (B), or after the kneading step (B).

In the kneading step (A), a rubber component including an isoprene-based rubber, sulfur, and a basic agent that, either itself or after decomposition with hydrogen sulfide, has a pKa in water at 25° C. of more than 8.0 are kneaded preferably at a kneading temperature of 150° C. to 250° C. In this kneading step, sulfur aggregates are broken and radicalized so that the sulfur can bond to the rubber component, and therefore the crosslinking initiation points can be present homogeneously in the rubber composition. Moreover, kneading these components with the basic agent promotes bonding of sulfur to the rubber component. Moreover, since the isoprene-based rubber can generate stable tertiary radicals at the allylic position, it is easily bonded to sulfur in the kneading step (A). Moreover, in conventional techniques, since sulfur has a higher solubility in polybutadiene rubber (BR) or styrene butadiene rubber (SBR) than in isoprene-based rubbers, sulfur will be localized in BR or SBR, thus making it difficult to form a homogeneously crosslinked structure. In contrast, the present invention may use the kneading step (A) to eliminate localization of sulfur in BR or SBR, thereby enabling the formation of a homogeneously crosslinked structure. Due to the above-described effects, the homogeneity of the crosslinked structure is improved to give a smaller correlation length $\Xi_b$. Thus, the resulting rubber composition shows low energy loss, excellent breaking energy, and excellent abrasion resistance.

The basic agent used in the kneading step (A) may be any basic agent that, either itself or after decomposition with hydrogen sulfide ($H_2S$), has an acid dissociation constant (pKa) in water at 25° C. of more than 8.0, preferably of more than 9.0. Basic agents with a higher pKa can better promote bonding of sulfur and the rubber component in the kneading step (A). Examples of such basic agents include guanidines such as 1,3-diphenylguanidine; hydrazides; and amine antioxidants such as N-phenyl-N'-(1,3-dimethylbutyl)-p-phenylenediamine. Other examples include sodium hydroxide and potassium hydroxide. Among these, guanidines are preferred, with 1,3-diphenylguanidine (DPG) being more preferred, because they are excellent in promoting bonding of sulfur to the rubber component, and they are less likely to cause scorching. Guanidines are usually used as secondary vulcanization accelerators for rubber compositions containing silica, and are not used in rubber compositions not containing silica, as described in JP 2008-274197 A (which is incorporated by reference in its entirety). The finding that such guanidines are excellent in promoting bonding of sulfur to the rubber component has not been known before.

The kneading temperature in the present invention means the highest temperature during kneading. As described earlier, in the kneading step (A), the kneading temperature may be set at 150° C. or higher to reduce the correlation length $\Xi_b$, while the kneading temperature may be set at 250° C. or lower to suppress thermal decomposition of the rubber component and scorching. To form a further homogeneously crosslinked structure so that further improved properties can be expected, the kneading temperature is preferably 160° C. or higher, more preferably 170° C. or higher, still more preferably 200° C. or higher. The kneading temperature may be controlled, for example, by adding fillers or using temperature controllers.

In preparing the rubber composition of the present invention, the kneading temperature in the kneading step (A) is not necessarily limited to 150° C. or higher. Moreover, a kneading temperature of 150° C. or higher does not always provide the rubber composition of the present invention. In the kneading step (A), the kneading duration may be increased to enhance dispersion of sulfur in the rubber, thereby reducing the correlation length $\Xi_b$; moreover, the kneading temperature may be increased at the same time. Furthermore, the dispersion of sulfur may be further enhanced by using a masterbatch containing the rubber component and sulfur (sulfur masterbatch). The correlation length $\Xi_b$ is difficult to reduce when the isoprene-based rubber content is low, e.g., less than 50% by mass of the total rubber component. However, with the above-described techniques, it is possible to obtain a rubber composition satisfying the correlation length $\Xi_b$ defined in the present invention. The following is provided as a guide for obtaining the rubber composition of the present invention: the kneading temperature and duration are preferably higher than 150° C. and 10 minutes or longer, respectively, for a rubber component containing 80 to 100% by mass of an isoprene-based rubber; preferably higher than 160° C. and 15 minutes or longer, respectively, for a rubber component containing at least 40% by mass but less than 80% by mass of an isoprene-based rubber; preferably higher than 170° C. and 15 minutes or longer, respectively, for a rubber component containing at least 20% by mass but less than 40% by mass of an isoprene-based rubber; and for a rubber component containing less than 20% by mass of an isoprene-based rubber, the kneading temperature and duration are preferably higher than 170° C. and 15 minutes or longer, respectively, while using a sulfur masterbatch as another rubber.

The kneading duration in the kneading step (A) is thus not particularly limited and may be appropriately set within a range of 1 to 60 minutes. The kneading in the kneading step (A) may also be performed by any manner, for example, by using a known kneading machine such as a Banbury mixer, a kneader, or an open roll mill.

Rubbers other than the isoprene-based rubber may be introduced and kneaded in the kneading step (A). Moreover, materials usually used in rubber compositions, such as zinc oxide, stearic acid, carbon black, silica, silane coupling agents, antioxidants, oils, waxes, and processing aids, may also be kneaded in the kneading step (A). However, vulcanization accelerators other than those which correspond to basic agents that, either themselves or after decomposition with hydrogen sulfide, have a pKa in water at 25° C. of more than 8.0 (e.g. DPG), are preferably not introduced during or before the kneading step (A) but kneaded in the kneading step (B) to suppress scorching. Moreover, since zinc oxide and stearic acid serve to inhibit reactions between the rubber component and the vulcanization accelerators, they are preferably introduced and kneaded after the rubber component and the vulcanization accelerators are kneaded to some extent, preferably at least one minute after the temperature reaches 150 to 250° C., in the kneading step (A). Alternatively, they are preferably kneaded in a step separate from the kneading step (A), more preferably in the kneading step (B).

The kneading step (B) includes kneading a kneaded mixture obtained after the kneading step (A) and a vulcanization accelerator. The kneading step (B) is preferably performed at 130° C. or lower to suppress scorching. The lower limit of the kneading temperature is preferably 70° C. to enhance dispersion of the vulcanization accelerator.

Any vulcanization accelerator may be used in the kneading step (B), including those commonly used in the tire industry as described above. Examples include guanidine vulcanization accelerators, sulfenamide vulcanization accelerators, thiazole vulcanization accelerators, thiuram vulcanization accelerators, dithiocarbamate vulcanization accelerators, thiourea vulcanization accelerators, and xanthate vulcanization accelerators. These vulcanization accelerators may be used alone, or two or more of these may be used in combination. Among these, sulfenamide vulcanization accelerators are preferred, and the following sulfenamide vulcanization accelerators may be used: N-cyclohexyl-2-benzothiazolylsulfenamide (CBS), N-oxydiethylene-2-benzothiazolylsulfenamide (OBS), N-(tert-butyl)-2-benzothiazolylsulfenamide (TBBS), N-(tert-butyl)-2-benzothiazolylsulfenimide (TBSI), N,N-dicyclohexylbenzothiazole-2-sulfenamide (DCBS), and N,N-diisopropylbenzothiazole-2-sulfenamide (DIBS).

The kneading duration in the kneading step (B) is not particularly limited, but is preferably 1 to 60 minutes. The kneading in the kneading step (B) may be performed in any manner, for example, by using a known kneading machine such as a Banbury mixer, a kneader, or an open roll mill.

In the kneading step (B), it is sufficient that at least the kneaded mixture obtained after the kneading step (A) and a vulcanization accelerator be kneaded, optionally together with other materials. As described above, zinc oxide and stearic acid are preferably kneaded in the kneading step (B).

The vulcanization step includes vulcanizing a unvulcanized rubber composition obtained after the kneading step (B).

The kneaded mixture (unvulcanized rubber composition) obtained through kneading steps including the kneading steps (A) and (B) may be vulcanized by a usual method to obtain a vulcanized rubber composition. The conditions for the vulcanization are not particularly limited. Preferably, the vulcanization is carried out by heating at 100 to 180° C. for 5 to 60 minutes. For tire production, the unvulcanized rubber composition may be extruded into the shape of a tread or other components and then formed and assembled with other tire components in a usual manner on a tire building machine to build an unvulcanized tire (green tire), which is then heated and pressurized in a vulcanizer.

Examples

The present invention will be specifically described with reference to, but not limited to, examples.

The chemicals used in the examples and comparative examples are listed below.

Isoprene-based rubber (IR): Nipol IR 2200 available from Zeon Corporation

BR: Ubepol BR150B available from Ube Industries, Ltd.

SBR: Tufdene 3830 (containing 37.5 parts by mass of oil per 100 parts by mass of rubber solids) available from Asahi Kasei Corporation Sulfur: powdered sulfur available from Karuizawa sulfur Co., Ltd.

Basic agent: NOCCELER D (1,3-diphenylguanidine (DPG) which after decomposition with hydrogen sulfide (guanidine) has a pKa in water at 25° C. of 12.5) available from Ouchi Shinko Chemical Industrial Co., Ltd.

Carbon black: DIABLACK N550 ($N_2SA$: 42 $m^2/g$) available from Mitsubishi Chemical Corporation Silica: ULTRASIL VN3 available from Evonik Silane coupling agent: NXT (3-octanoylthiopropyl-triethoxysilane) available from Momentive Antioxidant: NOCRAC 6C (N-phenyl-N'-(1,3-dimethylbutyl)-p-phenylenediamine) (6PPD) available from Ouchi Shinko Chemical Industrial Co., Ltd.

Zinc oxide: zinc oxide #1 available from Mitsui Mining & Smelting Co., Ltd.

Stearic acid: stearic acid "TSUBAKI" available from NOF Corporation

Vulcanization accelerator: NOCCELER CZ (N-cyclohexyl-2-benzothiazolylsulfenamide (CBS)) available from Ouchi Shinko Chemical Industrial Co., Ltd.

Examples and Comparative Examples (First Kneading Step)

Kneading was performed using a 3 L Banbury mixer according to each of the formulations (parts by mass) and kneading conditions indicated in Tables 1 to 6.

(Second Kneading Step)

The kneaded mixture obtained in the first kneading step was kneaded with the total amounts (parts by mass) of the materials listed in Table 1 to 6 using a 3 L Banbury mixer at a kneading temperature of 100° C. for 15 minutes.

(Third Kneading Step)

The kneaded mixture obtained in the second kneading step was kneaded with the total amounts (parts by mass) of the materials listed in Table 1 to 6 using an open two-roll mill at a kneading temperature of 100° C. for five minutes.

(Vulcanization Step)

The unvulcanized rubber composition obtained in the third kneading step was heated at 140° C. for 50 minutes using a pressing machine to obtain a vulcanized rubber composition.

The vulcanized rubber compositions prepared as above were evaluated as described below. The results are given in the lower parts of Tables 1 to 6.

<SANS Analysis>

A plate-like sample (molded product) having a thickness of about 1 mm, a length of about 16 mm, and a width of about 16 mm was swollen to equilibrium in deuterated toluene, and attached to a sample holder. The sample was then irradiated with neutrons at room temperature. Absolute scattering intensity curves were obtained by measuring the sample at distances from the detector of 2.5 m, 10 m, and 10 m with a focusing lens, and then combined by least squares. These three curves were combined in the following manner: the scattering intensity curve obtained by measuring the sample at a distance from the detector of 2.5 m was fixed, and the scattering intensity curves obtained by measuring at a distance of 10 m with and without the focusing lens were shifted. The thus obtained scattering intensity curve I was fitted by least squares using Equations 1 to 6 to determine the correlation length $\Xi_b$(nm).

(SANS Apparatus)

SANS: SANS device in SANS-J, which is a beamline at JRR-3 of the Japan Atomic Energy Agency, Independent Administrative Agency.

(Analysis Conditions)

Neutron wavelength: 6.5 Å

Flux density of neutrons: $9.9 \times 10^7$ neutrons/$cm^2$/s

Distance from sample to detector: 2.5 m and 10 m (In order to obtain information at smaller angles, the sample was further measured at a distance from the detector of 10 m using a focusing lens.)

(Detector)

Two-dimensional detector ($^3$He two-dimensional detector and two-dimensional photomultiplier tube+ZnS/$^6$LiF detector)

<Tan δ Index at 60° C.>

The tan δ was measured using a spectrometer (Ueshima Seisakusho Co., Ltd.) at a dynamic strain amplitude of 1%, a frequency of 10 Hz, and a temperature of 60° C. In Tables 1 to 6, the reciprocals of the tan δ values are expressed as an index, with Comparative Examples 1 to 6, respectively, set equal to 100. A higher index indicates less energy loss, and an index of 100 or higher is considered good.

<Breaking Energy Index at 25° C.>

Rubber specimens punched out in No. 3 dumbbell shape were elongated until breakage at a rate of 200 mm/min using an autograph (Shimadzu Corporation) to measure the elastic modulus (tensile strength at break) and elongation (elongation at break) upon breakage. The measurement temperature was 25° C. The product of the obtained two values was divided by two, and this quotient was defined as breaking energy. In Tables 1 to 6, the results are expressed as an index, with Comparative Examples 1 to 6, respectively, set equal to 100. A higher index indicates higher breaking energy, and an index of 100 or higher is considered good.

<Abrasion Resistance Index>

The abrasion loss was measured using a Lambourn abrasion tester at room temperature, a load of 1.0 kgf, and a slip ratio of 30%. In Tables 1 to 6, the reciprocals of the abrasion losses are expressed as an index, with Comparative Examples 1 to 6, respectively, set equal to 100. A higher index indicates higher abrasion resistance, and an index of 100 or higher is considered good.

TABLE 1

|  |  | Example | | | | Comparative Example |
|---|---|---|---|---|---|---|
|  |  | 1 | 2 | 3 | 4 | 1 |
| First kneading step | IR | 100 | 100 | 100 | 100 | 100 |
|  | BR | — | — | — | — | — |
|  | SBR | — | — | — | — | — |
|  | Sulfur | 2 | 2 | 2 | 2 | 2 |
|  | Basic agent | 2 | 2 | 2 | 2 | 2 |
|  | Kneading temperature (° C.) | 160 | 171 | 195 | 166 | 150 |
|  | Kneading duration (min) | 10 | 10 | 10 | 10 | 10 |
| Second kneading step | Carbon black | 50 | 50 | 50 | 5 | 50 |
|  | Silica | — | — | — | 70 | — |
|  | Silane coupling agent | — | — | — | 5 | — |
|  | Antioxidant | 1 | 1 | 1 | 1 | 1 |
| Third kneading step | Zinc oxide | 3 | 3 | 3 | 3 | 3 |
|  | Stearic acid | 4 | 4 | 4 | 4 | 4 |
|  | Vulcanization accelerator | 2 | 2 | 2 | 2 | 2 |
| Vulcanized properties | Ξb | 14 | 9 | 16 | 17 | 56 |
|  | tan δ index at 60° C. | 118 | 142 | 112 | 131 | 100 |
|  | Breaking energy index at 25° C. | 143 | 184 | 133 | 150 | 100 |
| Properties | Abrasion resistance index | 145 | 188 | 136 | 151 | 100 |

TABLE 2

|  |  | Example | | | Comparative Example |
|---|---|---|---|---|---|
|  |  | 5 | 6 | 7 | 2 |
| First kneading step | IR | 75 | 75 | 75 | 75 |
|  | BR | 25 | 25 | 25 | 25 |
|  | SBR | — | — | — | — |
|  | Sulfur | 2 | 2 | 2 | 2 |
|  | Basic agent | 2 | 2 | 2 | 2 |
|  | Kneading temperature (° C.) | 160 | 161 | 151 | 149 |
|  | Kneading duration (min) | 10 | 15 | 20 | 10 |
| Second kneading step | Carbon black | 50 | 50 | 50 | 50 |
|  | Silica | — | — | — | — |
|  | Silane coupling agent | — | — | — | — |
|  | Antioxidant | 1 | 1 | 1 | 1 |
| Third kneading step | Zinc oxide | 3 | 3 | 3 | 3 |
|  | Stearic acid | 4 | 4 | 4 | 4 |
|  | Vulcanization accelerator | 2 | 2 | 2 | 2 |
| Vulcanized properties | Ξb | 25 | 19 | 23 | 61 |
|  | tan δ index at 60° C. | 111 | 120 | 113 | 100 |
|  | Breaking energy index at 25° C. | 132 | 150 | 135 | 100 |
| Properties | Abrasion resistance index | 131 | 148 | 133 | 100 |

TABLE 3

|  |  | Example | | Comparative Example |
|---|---|---|---|---|
|  |  | 8 | 9 | 3 |
| First kneading step | IR | 50 | 50 | 50 |
|  | BR | 50 | 50 | 50 |
|  | SBR | — | — | — |
|  | Sulfur | 2 | 2 | 2 |
|  | Basic agent | 2 | 2 | 2 |
|  | Kneading temperature (° C.) | 161 | 196 | 151 |
|  | Kneading duration (min) | 10 | 10 | 10 |
| Second kneading step | Carbon black | 50 | 50 | 50 |
|  | Silica | — | — | — |
|  | Silane coupling agent | — | — | — |
|  | Antioxidant | 1 | 1 | 1 |
| Third kneading step | Zinc oxide | 3 | 3 | 3 |
|  | Stearic acid | 4 | 4 | 4 |
|  | Vulcanization accelerator | 2 | 2 | 2 |
| Vulcanized properties | Ξb | 34 | 40 | 66 |
|  | tan δ index at 60° C. | 108 | 107 | 100 |
|  | Breaking energy index at 25° C. | 127 | 125 | 100 |
| Properties | Abrasion resistance index | 125 | 122 | 100 |

TABLE 4

|  |  | Example | Comparative Example |
|---|---|---|---|
|  |  | 10 | 4 |
| First kneading step | IR | 40 | 40 |
|  | BR | 60 | 60 |
|  | SBR | — | — |
|  | Sulfur | 2 | 2 |
|  | Basic agent | 2 | 2 |
|  | Kneading temperature (° C.) | 164 | 150 |
|  | Kneading duration (min) | 15 | 10 |

TABLE 4-continued

|  |  | Example 10 | Comparative Example 4 |
|---|---|---|---|
| Second kneading step | Carbon black | 50 | 50 |
|  | Silica | — | — |
|  | Silane coupling agent | — | — |
|  | Antioxidant | 1 | 1 |
| Third kneading step | Zinc oxide | 3 | 3 |
|  | Stearic acid | 4 | 4 |
|  | Vulcanization accelerator | 2 | 2 |
| Vulcanized properties | Ξb | 36 | 67 |
|  | tan δ index at 60° C. | 106 | 100 |
|  | Breaking energy index at 25° C. | 122 | 100 |
| Properties | Abrasion resistance index | 120 | 100 |

TABLE 5

|  |  | Example 11 | Comparative Example 5 |
|---|---|---|---|
| First kneading step | IR | 20 | 20 |
|  | BR | 10 | 10 |
|  | SBR | 96.25 | 96.25 |
|  | Sulfur | 2 | 2 |
|  | Basic agent | 2 | 2 |
|  | Kneading temperature (° C.) | 171 | 151 |
|  | Kneading duration (min) | 15 | 10 |
| Second kneading step | Carbon black | 50 | 50 |
|  | Silica | — | — |
|  | Coupling agent | — | — |
|  | Antioxidant | 1 | 1 |
| Third kneading step | Zinc oxide | 3 | 3 |
|  | Stearic acid | 4 | 4 |
|  | Vulcanization accelerator | 2 | 2 |
| Vulcanized properties | Ξb | 47 | 76 |
|  | tan δ index at 60° C. | 104 | 100 |
|  | Breaking energy index at 25° C. | 115 | 100 |
| Properties | Abrasion resistance index | 115 | 100 |

TABLE 6

|  |  | Example 12 | Comparative Example 6 |
|---|---|---|---|
| First kneading step | IR | 50 | 50 |
|  | BR | 50 | 50 |
|  | SBR | — | — |
|  | Sulfur | 2 | — |
|  | Basic agent | 2 | — |
|  | Kneading temperature (° C.) | 160 | 160 |
|  | Kneading duration (min) | 10 | 10 |
| Second kneading step | Carbon black | 50 | 50 |
|  | Silica | — | — |
|  | Silane coupling agent | — | — |
|  | Antioxidant | 1 | 1 |
| Third kneading step | Zinc oxide | 3 | 3 |
|  | Stearic acid | 4 | 4 |
|  | Sulfur | — | 2 |
|  | Basic agent | — | 2 |
|  | Vulcanization accelerator | 2 | 2 |
| Vulcanized properties | Ξb | 34 | 66 |
|  | tan δ index at 60° C. | 108 | 100 |
|  | Breaking energy index at 25° C. | 127 | 100 |
| Properties | Abrasion resistance index | 125 | 100 |

As shown in Tables 1 to 6, all the properties were improved in the examples with a correlation length $\Xi_b$ of 50 nm or less, compared to the respective reference comparative examples. Thus, it is considered that there was no significant decrease in properties caused by excessive thermal decomposition of the rubber component.

The invention claimed is:

1. A tire, formed from a rubber composition for tires, the rubber composition for tires comprising a rubber component including an isoprene-based rubber, the rubber composition for tires being formed by a method that includes kneading at a temperature of 160° C. to 196° C. the isoprene-based rubber, sulfur and a basic agent that, either itself or after decomposition with hydrogen sulfide, has a pKa in water at 25° C. of over 8.0 in order to obtain a correlation length $\Xi_b$ of 50 nm or less as determined by fitting the following Equations 1 to 6 to a scattering intensity curve I(q) obtained by X-ray scattering analysis or neutron scattering analysis:

$$I_{(q)} = \frac{A}{1+q^2\xi^2} + \frac{B}{(1+q^2\Xi_b^2)^2} + \frac{C}{(1+q^2\Xi_c^2)^2} \quad \text{(Equation 1)}$$

$$\xi < \Xi_b < \Xi_c \quad \text{(Equation 2)}$$

$$A = 8\pi N_a \sigma^2 \xi^3 \quad \text{(Equation 3)}$$

$$B = 4\pi N_b \sigma^2 \Xi_b^2 \quad \text{(Equation 4)}$$

$$C = 4\pi N_c \sigma^2 \Xi_c^2 \quad \text{(Equation 5)}$$

$$q = \frac{4\pi \sin\frac{\theta}{2}}{\lambda} \quad \text{(Equation 6)}$$

A, B, C, $\xi$, $\Xi_b$, $\Xi_c$: fitting parameter
q: scattering vector
$N_a$: number per unit volume (number/cm$^3$) of scatterers having a correlation length $\xi$
$N_b$: number per unit volume (number/cm$^3$) of scatterers having a correlation length $\Xi_b$
$N_c$: number per unit volume (number/cm$^3$) of scatterers having a correlation length $\Xi_c$
σ: electron density difference (electron·(cm$^{-3}$)) between scatterers and the surrounding matrix or scattering length density difference (cm$^{-2}$) between scatterers and the surrounding solvent
θ: scattering angle
λ: wavelength of X rays or neutrons.

2. The tire according to claim 1, wherein the X-ray scattering analysis is small-angle X-ray scattering analysis, and the neutron scattering analysis is small-angle neutron scattering analysis.

3. The tire according to claim 1, wherein the value of q defined by Equation 6 is 10 nm$^{-1}$ or less.

4. A method for producing the tire according to claim 1, the method comprising:
a kneading step (A) of kneading at a temperature of 160° C. to 196° C. the isoprene-based rubber, sulfur, and a basic agent that, either itself or after decomposition with hydrogen sulfide, has a pKa in water at 25° C. of more than 8.0;
a kneading step (B) of kneading a kneaded mixture obtained after the kneading step (A) and a vulcanization accelerator; and
a vulcanization step of vulcanizing a kneaded mixture obtained after the kneading step (B).

* * * * *